(12) United States Patent
Vandenberg

(10) Patent No.: US 12,467,493 B2
(45) Date of Patent: Nov. 11, 2025

(54) SELF-SEALING FASTENER AND RELATED METHOD OF USE

(71) Applicant: National Nail Corp., Grand Rapids, MI (US)

(72) Inventor: Roger A. Vandenberg, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 349 days.

(21) Appl. No.: 18/113,377

(22) Filed: Feb. 23, 2023

(65) Prior Publication Data

US 2023/0304523 A1 Sep. 28, 2023

Related U.S. Application Data

(60) Provisional application No. 63/323,264, filed on Mar. 24, 2022.

(51) Int. Cl.
*F16B 15/02* (2006.01)
*F16B 43/00* (2006.01)

(52) U.S. Cl.
CPC ............ *F16B 15/02* (2013.01); *F16B 43/001* (2013.01)

(58) Field of Classification Search
CPC ..... F16B 15/02; F16B 15/0092; F16B 33/004
USPC .......... 411/469, 473, 474, 480, 482
See application file for complete search history.

(56) References Cited

U.S. PATENT DOCUMENTS

| | | | | |
|---|---|---|---|---|
| 2,086,086 A | * | 7/1937 | Lassonde | F16B 15/02 411/371.1 |
| 2,140,749 A | * | 12/1938 | Kaplan | F16B 15/02 470/34 |
| 2,353,110 A | * | 7/1944 | Camp | F16B 15/02 411/923 |
| 2,353,315 A | * | 7/1944 | Maze | F16B 15/02 470/7 |
| 2,439,516 A | * | 4/1948 | Holcomb | F16B 43/001 411/533 |
| 2,724,303 A | * | 11/1955 | Holcomb | F16B 15/0092 52/553 |
| 2,927,495 A | | 3/1960 | Barwood | |
| 3,202,033 A | | 8/1965 | Weidner, Jr. | |
| 3,218,215 A | * | 11/1965 | Havens | B29C 45/14311 428/424.4 |
| 3,726,178 A | | 4/1973 | Dimitry | |
| 3,994,200 A | | 11/1976 | Swanson | |

(Continued)

*Primary Examiner* — Flemming Saether
(74) *Attorney, Agent, or Firm* — Warner Norcross + Judd LLP

(57) ABSTRACT

A self-sealing fastener is provided to preserve fluid barriers on building components such as panels, sheets, boards and other work pieces. The fastener can be a form of a nail having a shaft and a pointed tip opposite a head that projects radially outward from the shaft. The fastener can include a striker post extending from the head opposite the shaft a preselected distance. A plug defining a bore can be placed atop the head and registered with the striker post so that the post extends through the bore. The post can extend above the plug, and the plug's upper surface can be unobstructed by any part of the fastener or post. A related method of use includes striking the post with an automated driver to drive the shaft into a panel; penetrating the panel with the head to create a hole; and plugging the hole above the head with the plug.

13 Claims, 9 Drawing Sheets

(56) References Cited

U.S. PATENT DOCUMENTS

| | | |
|---|---|---|
| 4,191,389 A | 3/1980 | Jelinek |
| 4,865,335 A | 9/1989 | McGann |
| 5,188,495 A | 2/1993 | Jones, Jr. |
| 5,524,907 A | 6/1996 | Walser |
| 5,827,032 A * | 10/1998 | Howard .............. F16B 15/0092 411/480 |
| 7,077,611 B2 | 7/2006 | Metschke |
| 7,311,493 B2 | 12/2007 | Remy et al. |
| 8,011,868 B2 | 9/2011 | Stephan |
| 8,336,275 B2 * | 12/2012 | Rodenhouse ......... E04F 13/045 52/363 |
| 8,616,818 B2 | 12/2013 | Travis |
| 8,708,630 B1 | 4/2014 | Curtis et al. |
| 8,920,088 B1 | 12/2014 | Garvin |
| 8,931,989 B2 | 1/2015 | Stephan |
| 9,239,074 B2 | 1/2016 | Lauer et al. |
| 2005/0147485 A1 * | 7/2005 | Strunk ................... F16B 15/02 411/372.5 |

\* cited by examiner

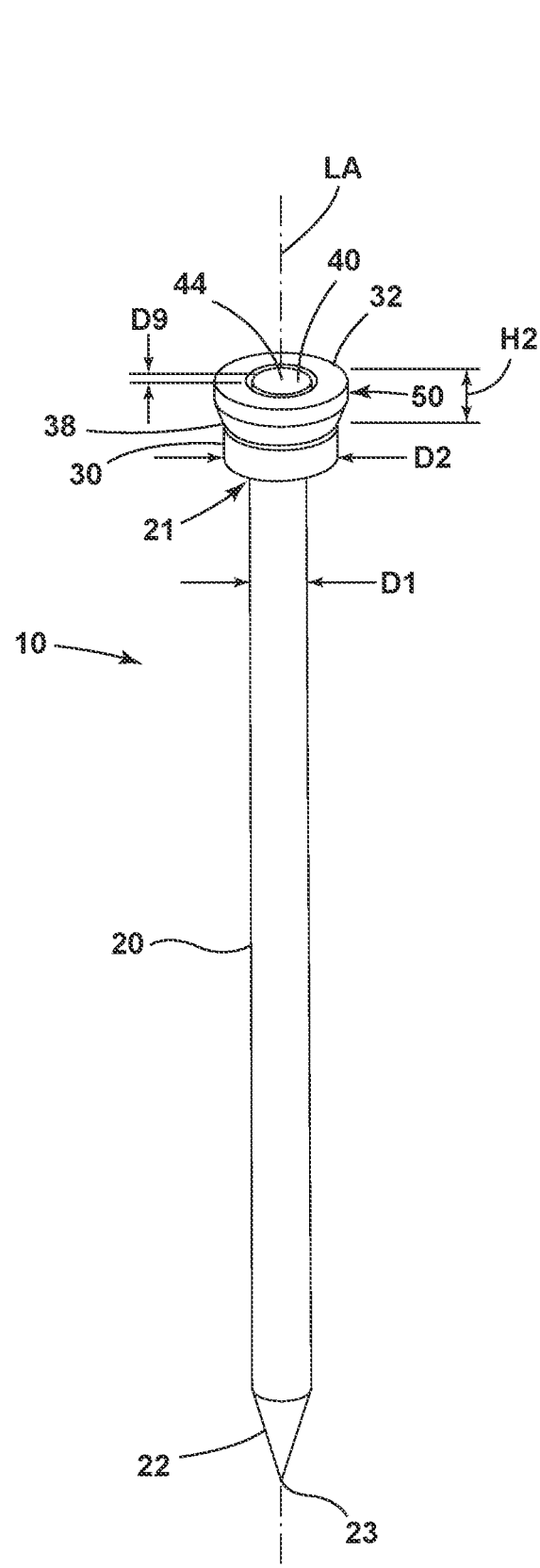
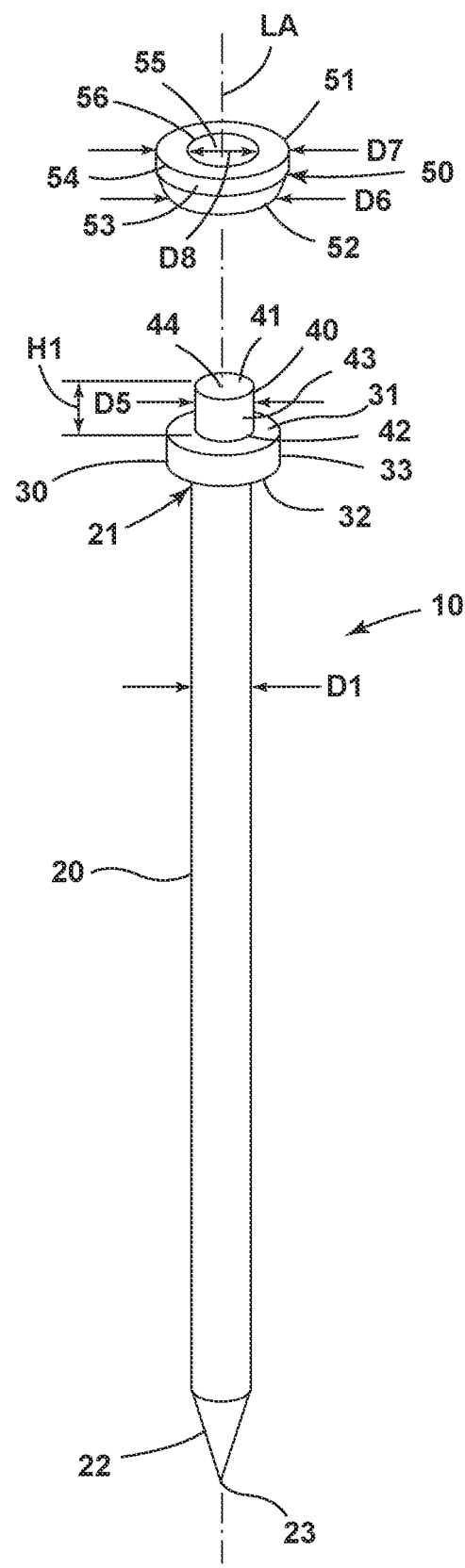
FIG. 1
FIG. 2

SELF-SEALING FASTENER AND RELATED METHOD OF USE

BACKGROUND OF THE INVENTION

The present invention relates to fasteners, and more particularly to self-sealing fasteners for use in construction and other applications.

Fasteners have been used in the construction industry for hundreds, if not thousands, of years to join one construction component to another. One example of a common fastener is a nail including a head and a shank extending from the head to a pointed tip. In one application, the nail can be driven tip-first to penetrate a panel, and advanced into an underlying support board to secure that first board or panel to the underlying support board. While this fastens the panel to the board adequately, it presents some issues, particularly with certain types of panels.

For example, in recent years, green board panels, coated panels, and other panels with films, coatings and/or paint applied to them have been used in construction to provide a water, moisture or air barrier to a structure under the panels. As with previous panels, these new types of panels are typically constructed from wood, and in the form of a multi-layered plywood or particle board. When a nail is driven through the outer barrier layer, it produces a hole through which fluids can enter the underlying wood or material around the nail. The head of the nail also can impact and splinter an area around the head and the shaft of the nail that extends through the panel. The head itself thus acts somewhat like a funnel or conduit under which water and moisture is pulled toward the shaft and into the wood structure of the board. Any splintered area around the impact point of the head can further expose the internal wood of the panel to the elements, due to the coating or film compromised and missing from that area. As a result, water and moisture are provided with a further infiltration point to enter and contact the internal wood material of the panel.

Accordingly, conventional nails can compromise the fluid barrier provided by external coatings, paint and/or films on most panels and building structures. Some conventional nails thus are offered with a rubber washer disposed around the shaft of the nail, under and below the head thereof. The rubber washer engages both the head and the panel after the nail is installed. The issue, however, can be that after time the rubber washer can rot out and decay. If it decays enough, it will no longer provide a seal around the head and shaft. It can therefore increase infiltration of water and moisture under the head, which usually will be spaced a distance away from the panel after the washer decays and rots away. Further, with the head separated from the exterior surface of the panel, the nail no longer provides a secure attachment of the panel to the underlying support. This can compromise the integrity of the panel-to-support connection. In some cases, the washer also can act like a wick to pull moisture from around the nail and under the head, thereby defeating the moisture sealing purpose of the washer.

Accordingly, there remains room for improvement in the field of fasteners, and in particular, self-sealing fasteners with enhanced and efficient moisture and fluid barrier preserving functionality.

SUMMARY OF THE INVENTION

A self-sealing fastener is provided to preserve fluid barriers on building components such as panels, sheets, boards or other work pieces. The fastener can include a shaft that projects away from a head. The fastener can include a striker post extending from the head opposite the shaft. A plug can be disposed atop the head and registered with the striker post. When the fastener is installed in a work piece, the plug can plug a recess above the head to provide a fluid barrier adjacent the fastener.

In one embodiment, the head can be joined with the elongated shaft and can extend radially outward from the longitudinal axis. The striker post can extend upward and away from the head to a terminal upper end including a striking surface. The plug can define a plug bore. The plug can be positioned along the longitudinal axis with the striker post extending through the plug bore.

In another embodiment, the striking surface can be configured to be struck by a driving tool to advance the elongated shaft into the work piece such that the head penetrates the work piece to produce the recess into which the plug is forced to plug the recess from a location above the head.

In still another embodiment, the plug can be positioned entirely above the head, without extending below the head. In some cases, the fastener can include only a single head that is the only head along the fastener.

In yet another embodiment, the head can include an upper head surface and a lower head surface. The plug can include a lower plug surface. The lower plug surface can engage the head only along the upper head surface.

In even another embodiment, the head can include a lower head surface including a cutting edge around a perimeter of the head. The cutting edge can be configured to cut into the work piece to produce the recess in the work piece. In so doing, the recess can be bounded by multiple severed and/or exposed fibers of the work piece. The plug can engage the ends or other parts of these severed fibers.

In a further embodiment, the striker post can extend away from the upper head surface farther than the plug, without any part of the fastener extending over the upper plug surface.

In still a further embodiment, the plug can be an elastomeric plug mounted to the fastener via the striker post. The striker post can extend within the plug, and the plug can rest atop or above the head of the fastener.

In still a further embodiment, a method of using the fastener includes striking the striker post with a tool face to drive the shaft into a panel; penetrating the panel with the head to create a recess; and plugging the recess above the head with the plug.

In yet a further embodiment, a method of using the fastener includes penetrating a work piece with a shaft of a fastener so that a head of the fastener produces a recess in an outer surface of the work piece; and plugging the recess with a plug of the fastener located above the head.

In even a further embodiment, the method can include pushing the plug into the recess above the head with a tool that simultaneously strikes a headless strike post which extends upward from the head. The plug can be compressed inward toward a longitudinal axis of the fastener during the plugging.

The fastener and methods of use of the current embodiments herein can provide an efficient and thorough seal or barrier around a fastener and a hole or recess produced by portions of the fastener in a work piece, such as a panel, sheet, board or other structure. The sealing plug being placed above the head of the fastener, and its sealing results, are counterintuitive and unexpected, as conventional seals are placed entirely below the head. The sealing plug can provide a thorough seal around a head or shaft, or a perimeter of a recess produced by the head of the fastener, so that fluids cannot reach the hole in the work piece in which the shaft is disposed. The seal or barrier produced by the plug disposed above the head also can conceal the head on the finished work piece, after installation of the fastener.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and can be practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 1 is a perspective view of a fastener of the current embodiment.

FIG. 2 is an exploded view thereof.

DETAILED DESCRIPTION OF THE CURRENT EMBODIMENTS

Figure 3:
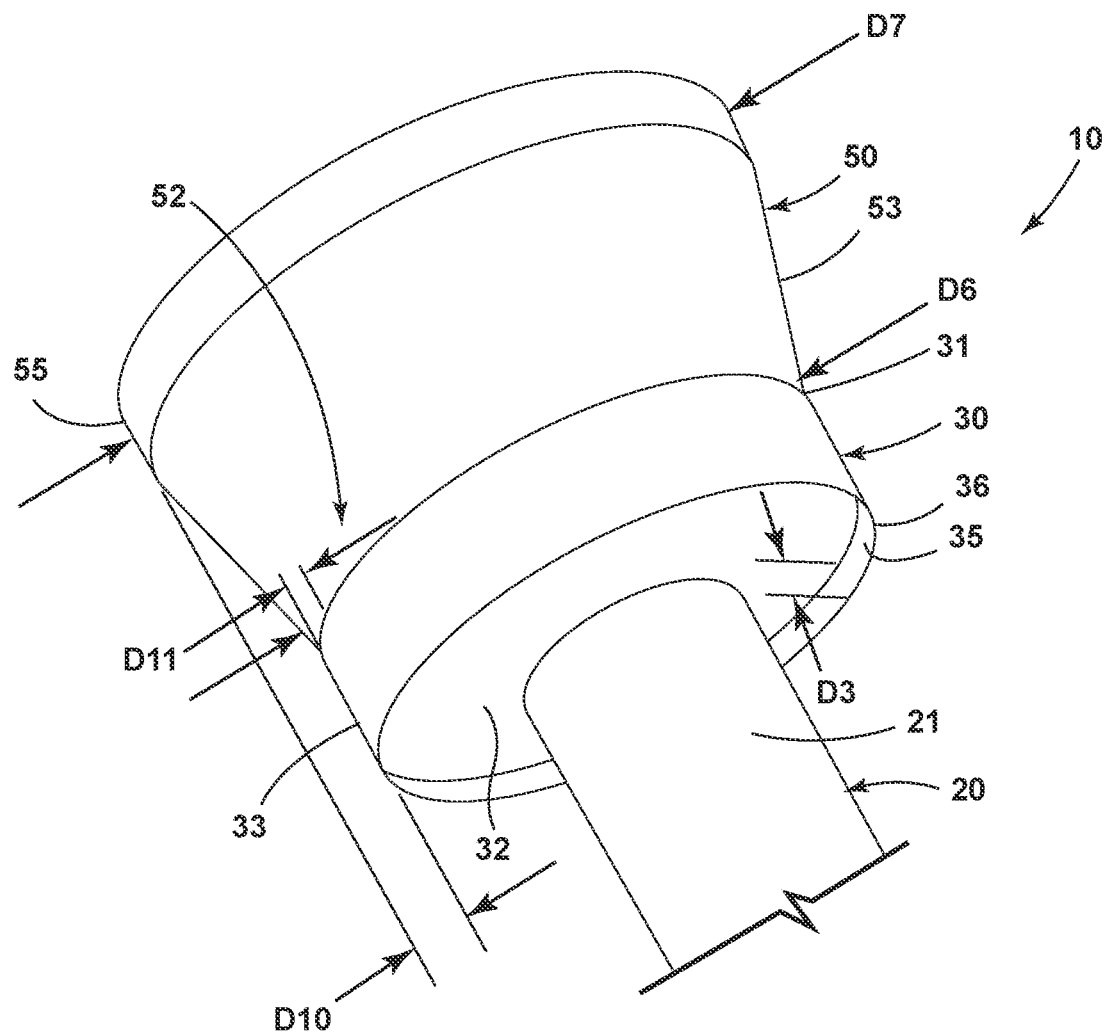
FIG. 3 is a lower perspective view of the head of the fastener.

A self-sealing fastener of a current embodiment is shown in FIGS. 1-5 and generally designated 10. The fastener 10 can be in the form of a nail. Although shown in the form of a nail, the fastener can otherwise be formed as a screw with threads, a rivet, a stud, staple or other type of fastener depending on the application. The fastener 10 in FIGS. 1 and 2 can include a longitudinal axis LA. An elongated shaft 20 can extend from a proximal end 21 to a distal end 22. The distal end can include a tip which optionally can be pointed 23 and configured to penetrate a work piece 1 as described below. The tip alternatively can be of a beveled, rounded or other configuration depending on the application and the work piece into which the fastener 10 is to be installed. The shaft 20 as shown optionally can include an exterior surface 23 having a smooth cylindrical configuration, however, in other embodiments, the exterior surface 23 of the shaft 20 can be knurled, pitted, ribbed, dimpled or can have other geometric patterns, protrusions and/or recesses defined therein. Further, although the exterior surface 23 is shown as having a continuous smooth cylindrical exterior surface, it can include steps, ridges and can be of varying diameters from the distal end 22 to the proximal end 21.

As further shown in FIGS. 1 and 2, the proximal end 21 can be joined with a head 30. This head 30 can project radially outward from the longitudinal axis LA. The head 30 can include a diameter D2 that is greater than the diameter D1 of the shaft 20. Generally, the head diameter D2 can be 10%, 20%, 30%, 40%, or 50% greater than the diameter D1 of the shaft. The head can include an upper head surface 31 and a lower head surface 32. The lower head surface 32 can face downwardly, generally toward the shaft and/or distal end 22, away from the proximal end 21. An exterior head wall 33 can extend between the head upper surface 31 and the head lower surface 32. This wall 33 can be generally cylindrical as shown, or can take on other geometric configurations. In some cases, the head also can be ribbed around the exterior head wall 33 or can include a knurled or other pattern along that wall.

As shown in FIG. 3, the head 30 optionally can include a cutting edge 35 that protrudes downwardly a distance D3 from the head's lower surface 32. This edge 35 can include a somewhat sharpened rim 35. This rim can form a cutting surface that can more cleanly and precisely cut, pierce or penetrate through a barrier layer with a work piece 1 as shown for example in FIG. 5. The cutting edge 35 also can be configured to cut, pierce and/or penetrate more cleanly through an upper surface and interior of the work piece 1, whether or not it includes the barrier layer 2. Although not shown, the cutting edge 35 can be serrated or include structures such as sharpened points or recess, depending on the cutting action of the head 30 relative to a work piece and/or a barrier thereof as described below. The cutting edge 35 optionally can extend around a perimeter of the head 30. Generally, the cutting edge 35 can be configured to cut into the work piece and produce a recess 3 as described below.

As illustrated, the head 30 of the fastener 10 can be the single and only head associated with the fastener 10. Further optionally, this head can be the only portion of the fastener with a large diameter relative to the shaft and striker post as described below. Optionally, the fastener can be constructed so that there are no other heads that extend outwardly from the longitudinal axis LA other than this head. In addition, as described below, this head can be configured so that it produces a recess 3 in a work piece 1 as described in connection with FIG. 5 below. The head can be further structured so that it does not rest against and/or flush with an exterior surface 4 of the barrier layer 2 and/or the work piece 1. Instead, this head 30 can be configured so that it penetrates below the exterior surface 4, a distance D5 when the fastener 10 is adequately installed in the work piece 1. The exterior surface 4 can be the exterior surface of the work piece and/or the barrier layer 2 if that layer is included on the board.

Figure 5:
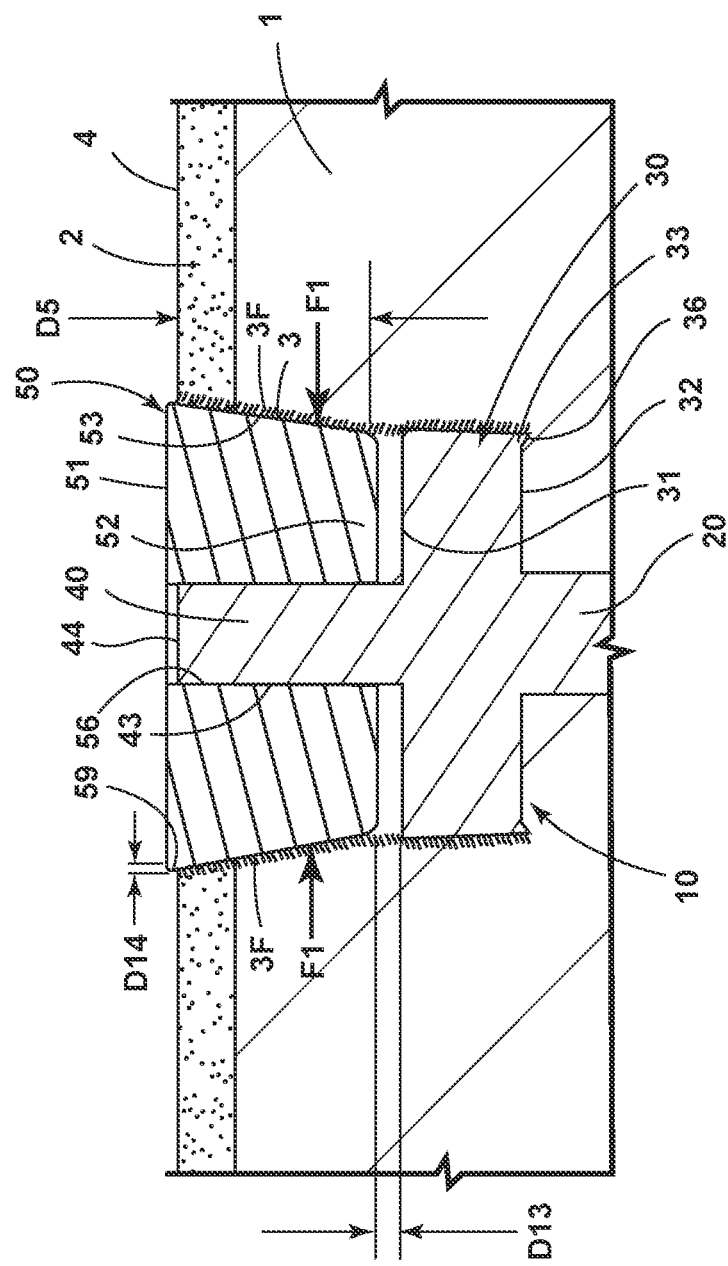
FIG. 5 is a section view of the fastener installed in the work piece having a barrier layer.

The fastener 10 shown in FIGS. 1 and 5 can include a striker post 40 extending from the head 30 opposite the shaft 20. In particular, the striker post can extend upward and away from the upper head surface 31 toward a terminal upper end 41. This terminal upper end 41 can include a striking surface 44, which can be configured to withstand the impact of a tool on that surface and transfer the associated forces through the fastener, its shaft and to the point, so that the fastener can be driven into a work piece as described below. The striker post 40 can include an exterior post wall 43 extending around the longitudinal axis LA. This exterior post wall 43 optionally can be cylindrical and have a diameter D4 that can be the same as, greater or less than the diameter D1 of the shaft. The diameter D4, however, can be less than the diameter D2 of the head.

The striking surface 44 as shown can be a round or circular shape, however in other constructions, it can be polygonal or other geometric shapes. In some cases, the shape of the striking surface, generally facing upward, can be selected based on the shape of a tool striking element, such as the face of a hammer or a blade of an automated fastener driver, depending on the application. Further, this striking surface 44 can be generally flat and planar as shown. In other applications, it can be concave, convex and/or can include patterns such as knurling, ridges, recesses or other elements to enhance the connection between a tool driver and a striking surface 44 of the striker post.

As mentioned above and with reference to FIG. 2, the exterior post wall 43 can extend around the striker post. The wall 43 can extend from the terminal end 41 to the base 42 of the striker post. The bottom of the base 42 can transition directly to the head 30, with the wall 43 being generally perpendicular or orthogonal to the upper head surface 31. Further, although the striker post exterior wall is shown as a generally cylindrical shape, it can take on other shapes, such as polygonal, triangular, elliptical, or other geometric shapes, depending on the application.

The striker post 40 can be integrally formed with the head 30 and the shaft 20 of the fastener. All these components can be formed from a common material, such as a metal, and more particularly, an alloy. Of course, other material such as composites, polymers and combinations thereof can be used to construct the components. Further, the striker post 40, head 30 and shaft 20 can be coated with a rust inhibitor and/or plated with a material such as zinc or a polymer, to prevent or inhibit rusting of that fastener 10. In other applications, these components can be painted, coated or otherwise treated for various purposes.

With further reference to FIGS. 1-5, the fastener 10 can include a plug 50. This plug 50 optionally can be constructed from a softer material than the striker post, head and shaft. In the embodiment shown, this plug 50 can be constructed from an elastomeric material so that it can slightly deform, flex and/or move relative to the striker post 40 and/or the head 30. In some applications, the plug 50 can be constructed from natural or synthetic rubber, silicone, polymers, elastomers, thermoplastic polyurethane, and/or combinations thereof. The plug 50 can include a lower plug surface 52 and an upper plug surface 51. The upper and lower plug surfaces can be generally flat and planar, as shown, but in some applications, they can be concave, convex or adorned with a pattern or array of protrusions and/or recesses. The plug 50 can include an exterior plug wall 53 that extends between the plug upper surface 51 and the plug lower surface 52. This plug exterior wall 53 can be in the form of a tapered or frustoconical configuration. The diameter D6 of the lower plug surface can be less than the diameter D7 of the plug 50 adjacent the upper plug surface 51. Optionally, a shoulder or edge 54 can extend around the longitudinal axis LA near the upper plug surface 51. This edge can be of a uniform diameter D7 for a small distance below that upper surface 51. In other cases, this shoulder or edge can be absent. It will be appreciated from FIGS. 1 and 2 that the frustoconical shape of the plug exterior wall 53 can give it a plug-like appearance, however, the plug can have other exterior wall profiles and features as described in the embodiments below, but can still be referred to as a plug.

With further reference to FIGS. 2-5, the plug 50 can define a plug bore 55 that extends through the plug from the lower plug surface 52 to the upper plug surface 51. This plug can be centered along the longitudinal axis LA. This plug bore 55 can be bounded by an interior plug wall 56, which can be of a cylindrical or other geometric shape and sized to fit over the striker post 40. The interior plug wall can interface and fit adjacent or engage the exterior post wall 43 when the plug is installed on the post. In some cases, the bore can be of a diameter D8 that is less than the diameter D4 of the post 40. This is so that the plug can friction fit on the post itself. In some cases, the plug can be held on the post above the head via substantially only the friction fit. In other constructions, the plug can be adhered, cemented, glued, melted or molded to or on the post and/or the head, in particular the upper surface of the head. A cement or adhesive can be applied to the upper head surface 31 and the exterior post wall 43 when the plug is installed on the post. The lower plug surface can be secured to the upper head surface, and the plug interior wall can adhere to the post exterior wall. Although not shown, the striker post can include a ridge or other projection, and the interior wall can include a corresponding recess so that the plug can mechanically interlock with the post. These features can be reversed depending on the application.

Optionally, the plug bore can be closed at the upper plug surface 51, such that a portion of the plug extends over the striker face 44. The portion of the plug may or may not be damaged when the fastener is impacted by a tool face.

With reference to FIG. 1, the plug 50 can be fitted to the post 40 so that the post projects slightly above, flush with or below the upper plug surface 51. Optionally, the striker surface 44 can be disposed a distance D9 above the upper plug surface 32. This distance can be less than the diameter D4 of the post, so that when installed, the post does not project too far above the plug and recess which the fastener 10 creates. The post can be flush or below the exterior surface 4 of the panel or work piece 4 in which the fastener is installed as described below. The striker post 40 can be of a height H1 that is greater than, less than or equal to the height H2 of the plug 50. This difference between heights can dictate whether the striker face 44 projects above the upper plug surface. Optionally, the height H1 minus the height H2 can be equal to the distance D9. In some cases, the ratio of the height H1:H2 can be optionally greater than 1:1, greater than 1:1.1, or greater than 1:1.2.

When installed on the post 40, the plug 50 can extend outward from the head a distance D10 as shown in FIG. 3. The distance D10 can be the distance (optionally a portion of a diameter or radius) from the outer perimeter of the head at the wall 33 to the outer shoulder 55 of the plug. Optionally, near the lower plug surface 52, the plug can extend inward from the wall 33 or perimeter of the head a distance D11, such that there is a small shelf 38 formed around the plug on the upper post surface. Of course, this distance D11 can be zero, in which there is no shelf formed, or alternatively, the lower portion of the plug can extend outwardly from and/or beyond the head in this area.

Figure 4:
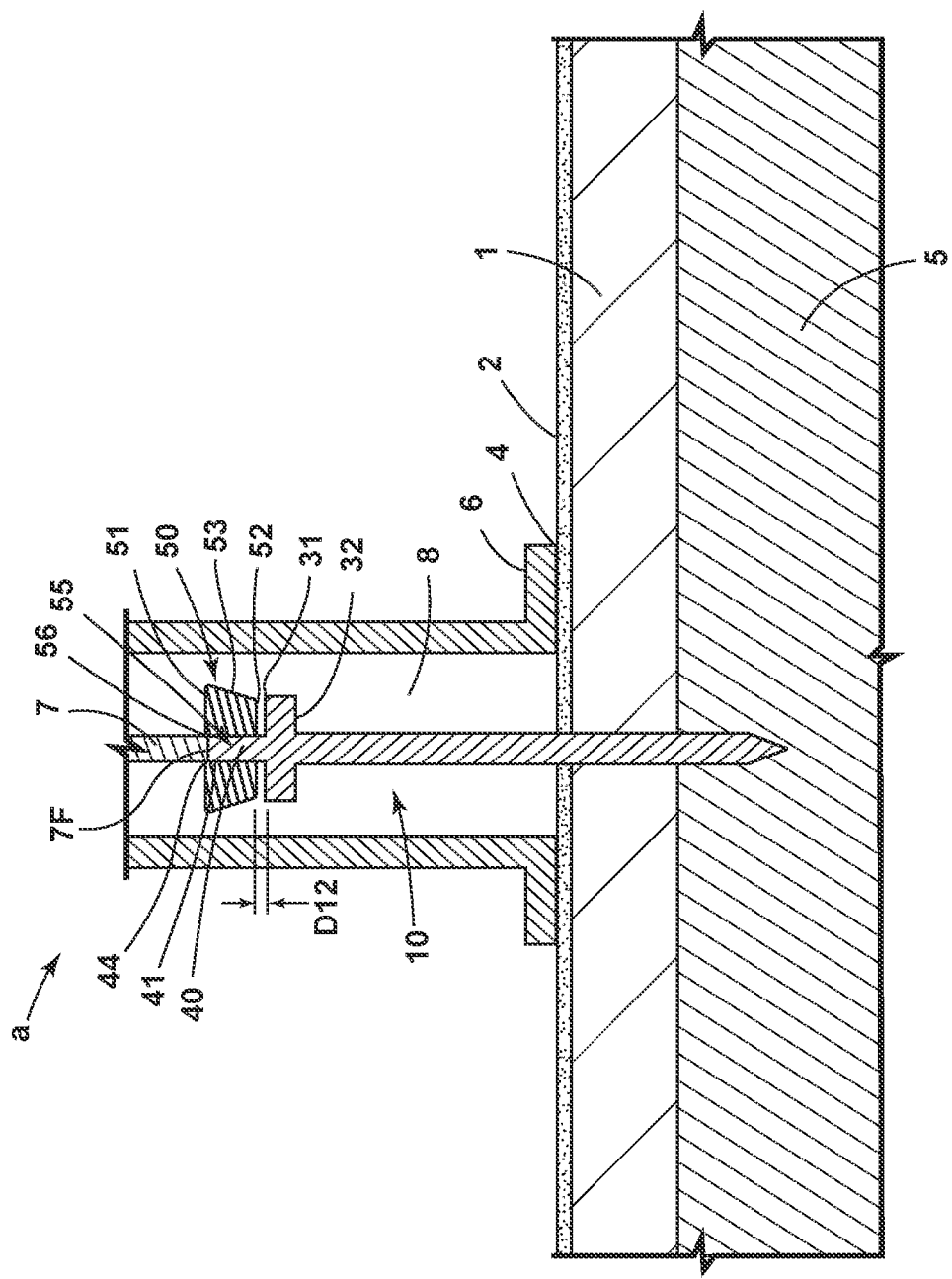
FIG. 4 is a section view of a tool initially driving the fastener into a work piece with a barrier layer.

Methods of using the fastener 10 of the current embodiment will now be described with reference to FIGS. 3-5. The fastener 10 can be installed in a work piece using a handheld hammer, stapler, tacker or other manual device, or a pneumatic nail gun, a percussion nail gun, an electric driver, a drill or other type of tool 9 depending on the application. As shown in FIG. 4, a pneumatic or electric driver can be used for installation. This tool can include a foot 6 that engages an exterior surface 4 of a work piece 1. As explained above, the exterior 4 can include a layer 2, which can be any type of coating, paint, film, dye, or other layer of material optionally different from the work piece 1. The foot can house a type of guide or bore 8 within which the fastener can be fed one by one in a collated manner along a strip or other carrier (not shown) for installation. The tool can include a moveable blade 7 or other structure having a tool face 7F that is configured to forcefully impact the striker surface 44 of the fastener 10 to advance the fastener 10 into the work piece 1 and into an underlying support 5.

As described herein, the work piece 1 can be in the form of a panel, sheet or other structure, and the support 5 can be in the form of a stud, joist, beam or other structure. The panel 1 can be constructed from wood, optionally in the form of plywood, particle board or a regular board. The work piece can be constructed from wood, but alternatively can be constructed from metal, composite, polymers or other materials. The layer 2 as mentioned above can be a paint, a coating, film or other layer constructed from polymers, dyes, paints, or other materials, and can generally cover the work piece exterior 4. The layer 2 can provide a barrier to fluids such as moisture, water, air, chemicals or other materials. When used in an outdoor environment, the layer can prevent fluids from reaching the work piece 1 and potentially rotting, degrading or otherwise changing in function. The issue with a fastener 10 piercing or penetrating the layer 2 can be that it creates a hole in the barrier layer 2, such that the fluids can enter the work piece through the hole, passing by the barrier. This is where the fastener with its self-sealing capabilities can be helpful.

On a high level, the method of using the fastener 10 can include penetrating a work piece with a shaft of a fastener so that a head of the fastener produces a recess in an outer surface of the work piece; and plugging the recess with a plug of the fastener located above the head. Another method can include providing the fastener including a shaft having a proximal end including a head and a distal end including a tip, a striker post extending away from the head opposite the shaft, and a plug mounted around the striker post above the head; striking a tool face against the striker post to advance the tip and shaft into a work piece so that the head penetrates the work piece to produce a recess; and plugging the recess in the work piece with the plug from a location above the head.

With reference to FIG. 4, the fastener 10 is shown there as it is initially being driven into the work piece, penetrating the layer 2 and the work piece 1. The blade 7 forcefully and rapidly is propelled downward toward the fastener 10, which can be collated along a strip. The tool face 7F strikes against the striker post 40, and in particular the striker face 44. When this occurs, the fastener can break from the carrier strip on which it is carried. The fastener then moves toward the exterior surface 4 with great speed and force. The tip penetrates the layer 2, then the work piece 1. As it penetrates the work piece, where the work piece is wood, the tip and shaft can produce many severed fibers of wood or other materials facing toward the same, sometimes in the form of splinters. In some cases, the tip and shaft might only bend, deform or break the fibers of wood around the shaft and the hole in the work piece that it creates.

Optionally, as shown in FIG. 4, the blade 7 impacting the striker post 40 can cause the plug 50 to move away from the head a distance D12. This distance can be the result of inertia exerted on the plug 50. When the tool face 7F strikes the strike face 44, the post 40 and fastener 10 can move downward quickly, however, the plug 50 can move less quickly, or accelerate at a slower rate, than the remainder of the fastener. This can cause the plug 50 to slide or move along the post 40 slightly. As a result, the lower plug surface 52 can move relative to the upper head surface 31 of the head 30. As shown, the plug 50 can slide upward and move relative to the upper head surface 31 during the striking. The blade 7, however, can engage the plug (into the page of FIG. 4), and can keep the plug 50 intact with the remainder of the fastener, and generally on the post as the post is propelled toward the work piece. The tool face 7F can contact both the strike face 44 and the upper plug surface 51 simultaneously, with both of these elements being pushed by the blade 7. In some cases, where the plug 50 is immovably joined with the striker post or the head, the plug might not move relative to the head to produce the distance D12. Optionally, the striker face 44 can be impacted by the blade, without the plug ever engaging the blade during the advancement of the fastener into the work piece.

As the fastener 10 is advanced by the blade 7, or a hand tool in a manual application of the fastener, the shaft 20 continues to penetrate the work piece 1. Eventually, the head 30 engages the work piece 1 and in particular the exterior surface 4. As it does, it begins to penetrate that surface as well. Where the head lower surface 32 includes the cutting edge 35 with the rim 36, that structure can cut, pierce or otherwise penetrate the exterior surface 4. As it does, where the barrier layer 2 is present, the cutting edge can cut through and penetrate the same. The cutting edge 35 can cut or deform the material of the work piece, which as mentioned above can be a wood or wood-like product, or some other material, depending on the application. As it does so, the head and its components can cut, sever, bend or deform a plurality of fibers 3F around the head. The blade can continue to push the head 30 into the surface 4 and the work piece 1 in general. The head can produce a recess 3 in the outer surface 4 of the work piece. This recess can be bounded by the cut, severed, bent or deformed fibers of the material of the work piece and portions of the barrier layer 2.

With reference to FIG. 5, the fastener 10 is advanced by the blade, with the tool face 7F pushing against the strike face 44 of the post 40, into the work piece 1 and any underlying support 5. The blade also can push the plug 50 into the recess 3, or the plug 50 can move along with the post 40 and face 50 into the recess. As the plug enters the recess, the exterior plug wall 53 can engage and press against the fibers 3F bounding the perimeter of the recess 3 in the work piece 1 produced by the head 30, above the head 30 and in the recess 3. The optional frustoconical exterior plug wall 53 can slide and press against the fibers, or other material, or the recess boundary in general. As the plug 50 is pressed into the recess R, the recess walls present a force F1 radially inward toward the longitudinal axis LA of the plug and fastener. This can compress the plug and exterior plug wall 53 inward, toward the axis LA. The interior plug wall 56 of the bore 55 also can be compressed or engaged further against the striker post 40 and the exterior wall 43 of the striker post. As this compression occurs, the plug 50 can initially or further frictionally engage the striker post to impair it from sliding off or disengaging the post. The plug also can exert a reactive force to the force F1, which can provide a sealing effect around the perimeter of the recess 3 produced by the head.

The plug and its seal also can extend to the perimeter of the hole produced in the barrier layer 2. As shown in FIG. 5, the outer perimeter 59 of the plug 50 can extend a distance D14 outward from the perimeter of the recess 3. This perimeter of the recess in the barrier layer 2 can be splintered, marred, deformed or irregular due to the impact of the head with the exterior surface 4 of the work piece. The perimeter 59 of the plug itself can extend outward and over this perimeter of the recess, thereby covering, concealing and protecting the severed fibers or other material in this area from the elements. In effect, the plug in this region can re-seal the barrier layer again. This sealing effect of the exterior surface 4, however, can be produced completely above the head of the fastener.

As further illustrated in FIG. 5, as the plug enters the recess, the plug can be pushed upward from the head a distance D13. This distance D13 can be minute, however, the lower plug surface 52 can separate that distance from the upper head surface 31 of the head. This distance can be maintained even after the fastener 10 is fully installed in the work piece. Of course, if the plug is optionally adhered or cemented to the head, or mechanically interlocked with the post, the plug may not move away from the head any distance. Optionally, in cases where the plug does move a distance away from the head, the striker face 44 can move downward relative to the plug and into the bore 55 a corresponding distance. The striker face 44 thus can be below the upper plug surface 51 when the fastener is installed. This position can be different from that before the fastener 10 is installed.

As can be seen in FIG. 5, during and after the installation of the fastener 10, the plug can seal the recess and the hole or opening to the remainder of the fastener from a position entirely above the head 30 of the fastener. The plug 50 can engage the striker post 40, and can actually move upward away from the head in the installed configuration. In the installed position, the plug lower surface 52 can engage and/or be adjacent the upper head surface of the head, rather than below the head. The lower head surface 32 can directly engage the material of the work piece 1 under the head. The lower head surface, however, optionally does not engage the plug or seal from underneath the head. The plug or seal 50 therefore is not below the head 30, or any other head of the fastener as shown.

Figure 6:
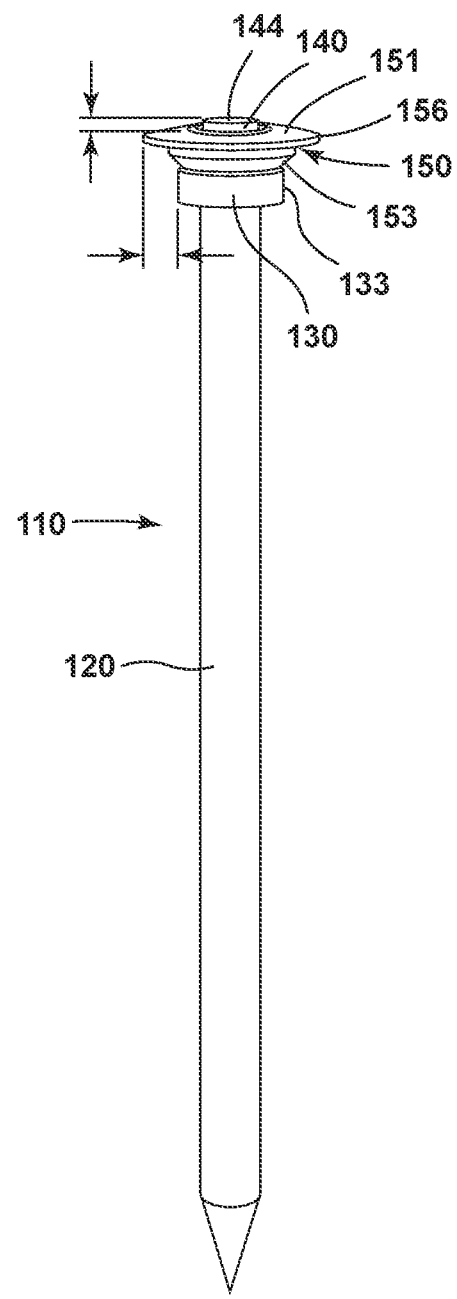
FIG. 6 is a perspective view of a fastener of a first alternative embodiment.
Figure 7:
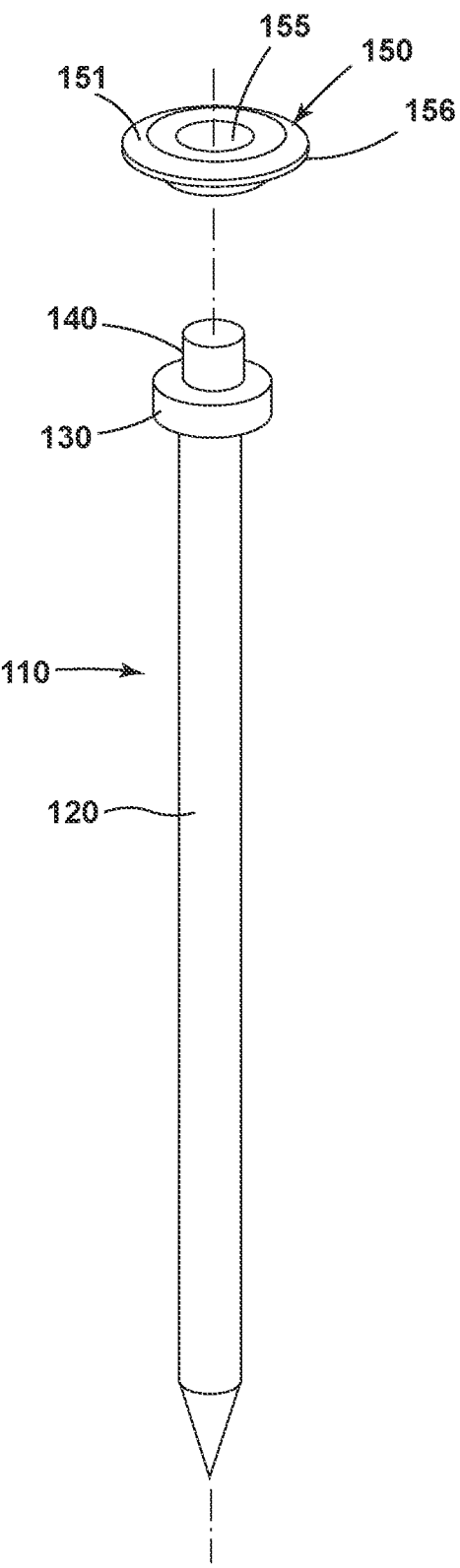
FIG. 7 is an exploded view thereof.
Figure 8:
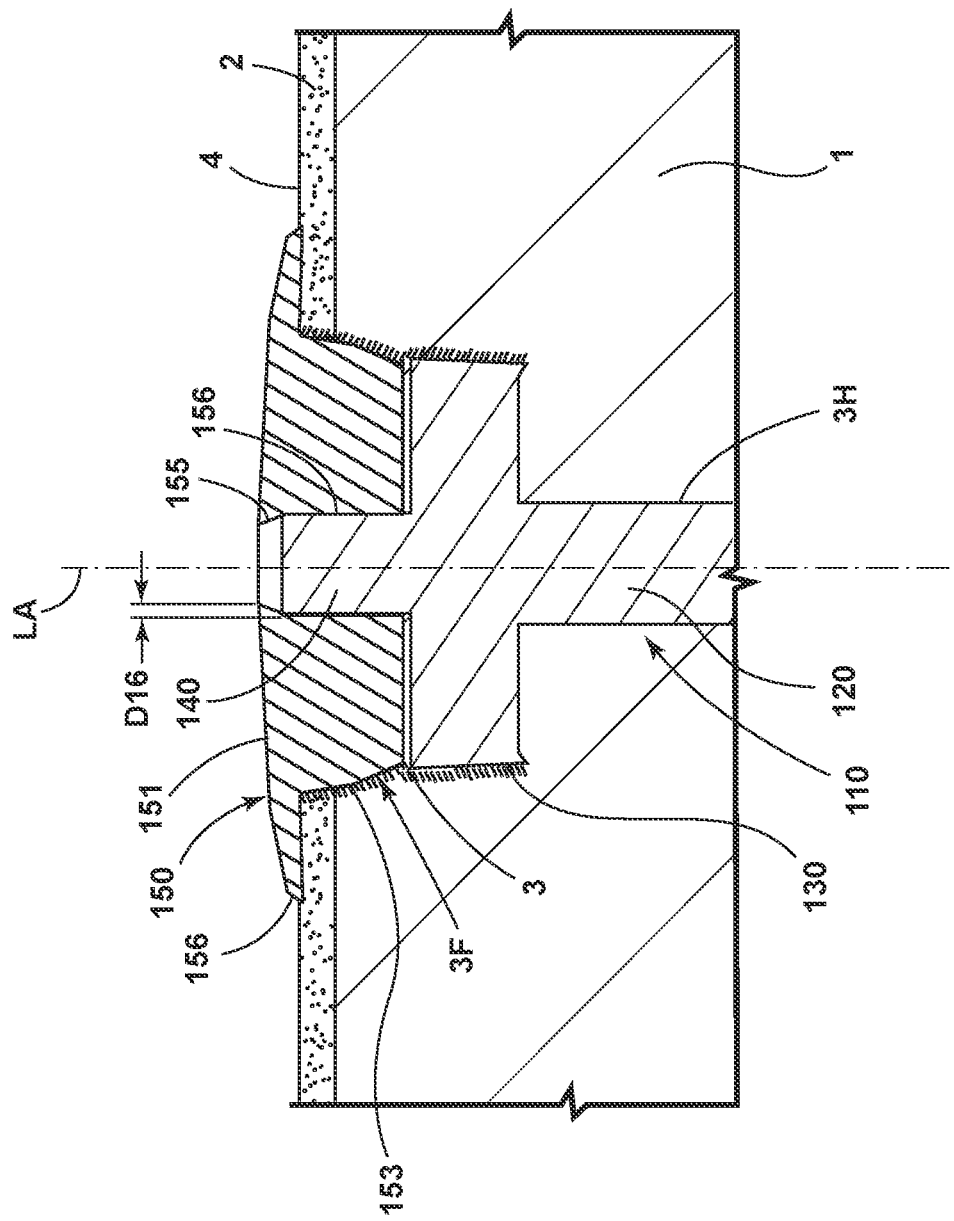
FIG. 8 is a section view of the fastener installed in the work piece having a barrier layer.

A first alternative embodiment of the fastener is shown in FIGS. 6-8 and generally designated 110. This embodiment is similar to the embodiment above in structure, function and operation with several exceptions. For example, this fastener 110 can include a shaft 120, a head 130 and a plug 150. The plug can include a plug bore 155 and can be fitted over the head and around the striker post 140. The plug however, can be of a different configuration. As shown, the plug can include a lower portion 153 having a frustoconical or tapered exterior wall that becomes larger farther from the head 130. The lower portion can transition to an outwardly extending flange 156 that forms a mushroom-type shape. The flange can overhang the head 130 and its exterior wall 133 a distance D15. This distance can be less than the diameter of the shaft 120. The flange 156 can transition to the upper plug surface 151, which can be convex or domed shaped as shown, or in a flat or planar shape. The dome can transition to the bore plug 155. Optionally, the striker face 144 in this embodiment can project a distance D14 above the upper plug surface 151. This distance can be less than the overhang distance D15 above.

The method of using or installing this fastener 110 can be similar to that of the embodiment described above. A tool face 7F can engage the striker face, and drive the fastener into a work piece. As shown in FIG. 8, the head 130 can cut a recess 3 into the work piece and into the exterior surface 4. The lower plug portion 153 can engage the severed fibers or material of the work piece, and/or the barrier layer 2, and seal against those elements within the recess. The upper portion and the flange 156 can extend outward and away from the recess 3, covering the outer perimeter of the recess as described above. This in turn can further conceal and protect any splintered, marred or damaged material or remnants around the perimeter of the recess near or at the exterior surface 4. The flange or plug in general can conceal the barrier layer and seal against it to prevent infiltration or moisture seeping beyond the plug and into the recess or the hole 3H produced by the shaft.

Optionally, in this embodiment, the inner wall of the bore 155 can deform or push inward a distance D16 toward the longitudinal axis as shown in FIG. 8, above the striker face 144. In so doing, the perimeter of the wall can move generally radially inward around the axis. In this configuration, the plug interior wall 156 can seal well against and/or firmly engage the striker post to further impair moisture or fluids from entering through the bore 155 into the recess or hole in the work piece. In so doing, the interior wall 156 can move radially inward, toward the longitudinal axis, and can circumferentially engage the exterior wall of the striker post.

Figure 9:
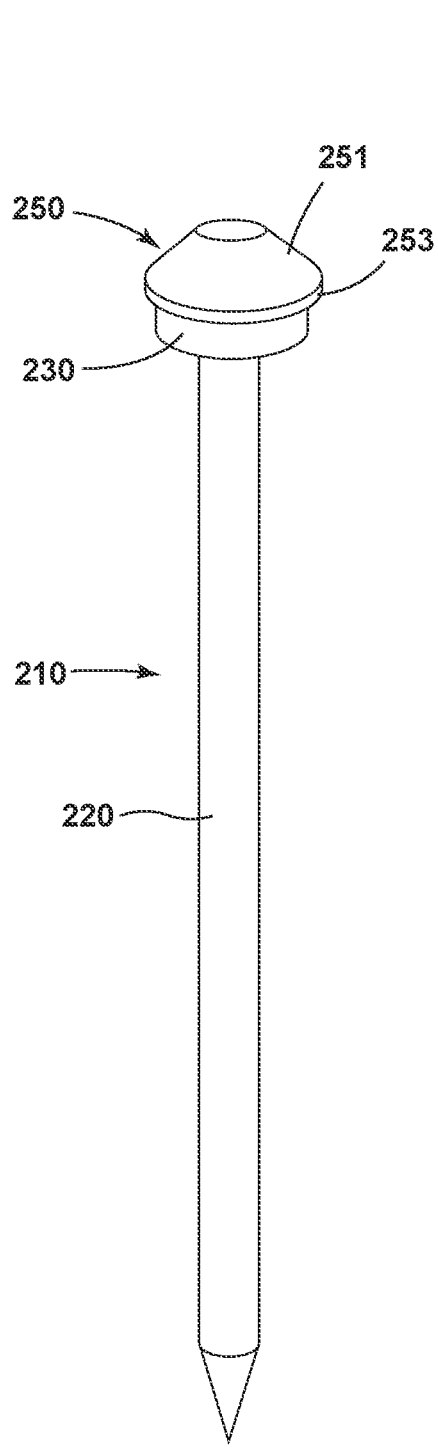
FIG. 9 is a perspective view of a fastener of a second alternative embodiment.
Figure 10:
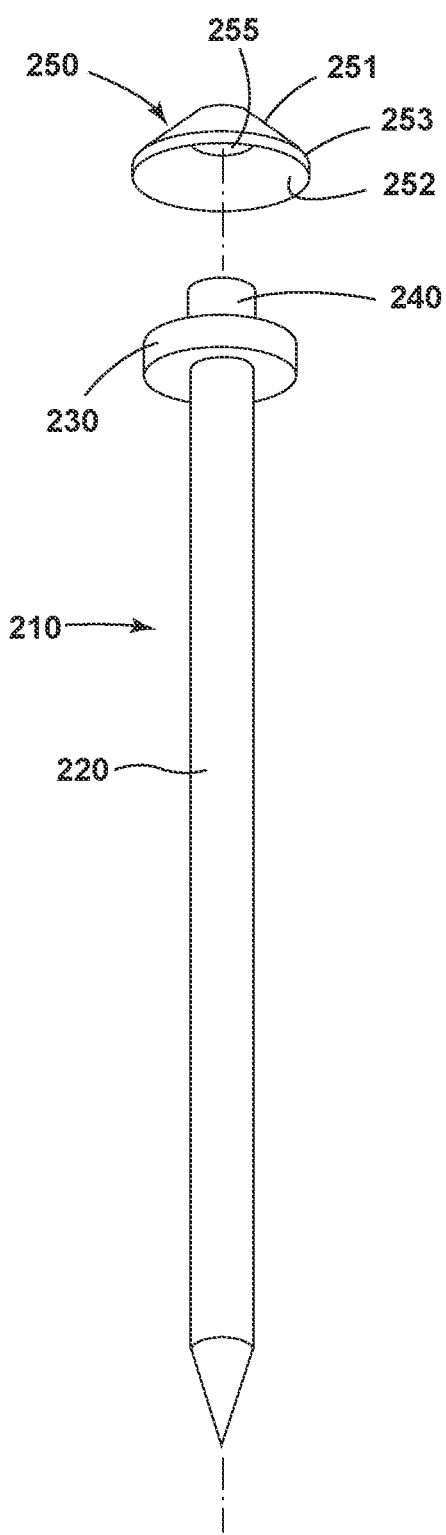
FIG. 10 is an exploded view thereof.
Figure 11:
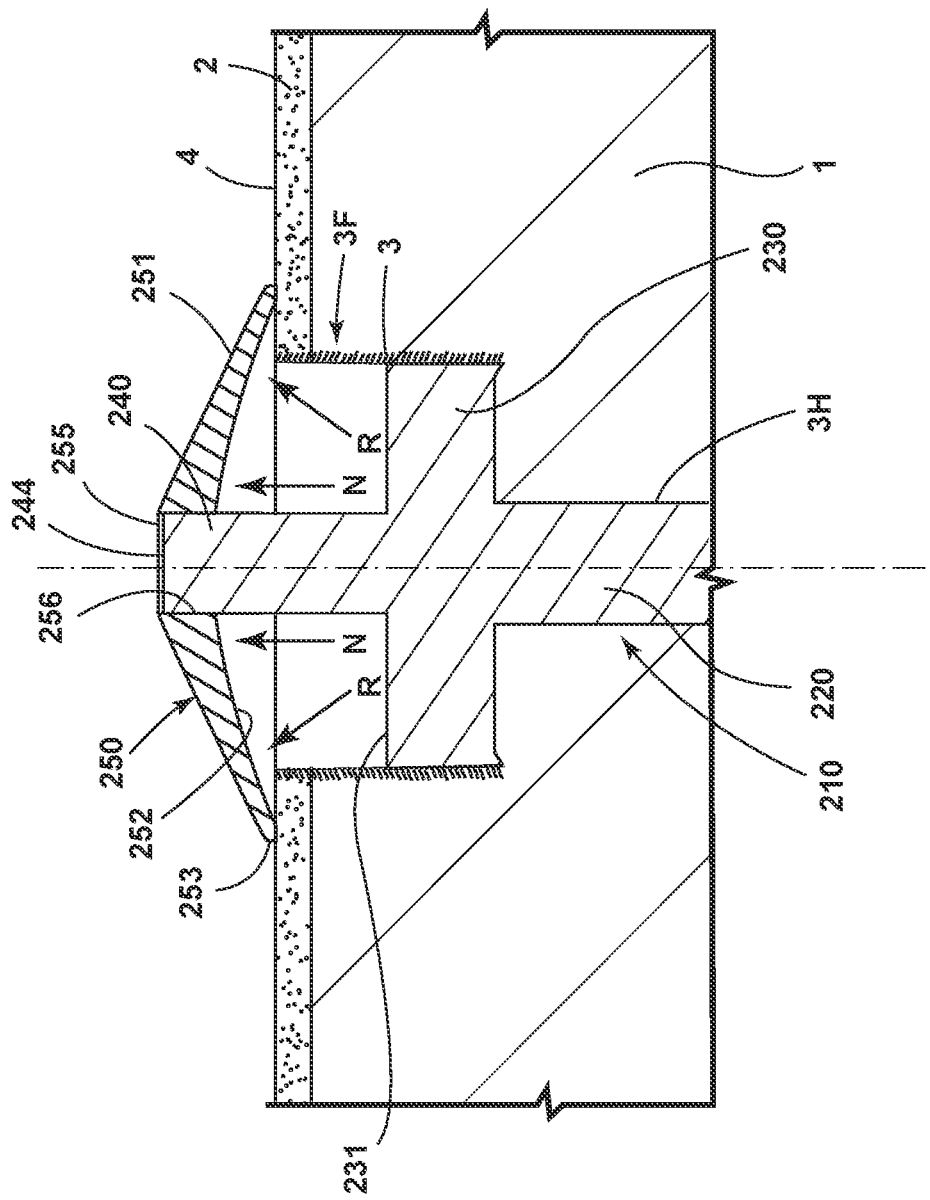
FIG. 11 is a section view of the fastener installed in the work piece having a barrier layer.

A second alternative embodiment of the fastener is shown in FIGS. 9-11 and generally designated 210. This embodiment is similar to the embodiment above in structure, function and operation with several exceptions. For example, this fastener 210 can include a shaft 220, a head 230 and a plug 250. The plug 250 can include a plug bore 255 and can be fitted over the head and around the striker post 240. The plug, however, can be of a different configuration. As shown, the plug can include an upper reversed frustoconical shape, such that the plug becomes narrower toward the uppermost part. The lower portion 253 of the plug can flare outward, with the plug thus being of an umbrella-type shape. The bore 255 also can become larger or open up extending from the upper portion to the lower portion of the plug. The upper plug surface 251 also can be of an upright frustoconical shape as shown in FIG. 9. The lower portion of the plug 250 can be bounded by a shoulder 253 which can be generally flat or cylindrical around a lower perimeter of the plug.

The method of using or installing this fastener 210 can be similar to that of the embodiment described above. A tool face 7F can engage the striker face, and drive the fastener into a work piece. As shown in FIG. 11, the head 230 can cut a recess 3 into the work piece and into the exterior surface 4. The lower portion 253 can engage the exterior surface and or portions of the recess to cover any severed fibers 3F or material of the work piece, and/or the barrier layer 2 and seal over those elements and the recess. The plug 250 also can flare out in direction R, away from the longitudinal axis. As it does so, the plug can slide or move upward along the striker post in direction N. In so doing, the inner walls 256 of the plug bore can constrict around and further frictionally engage the striker post 240. In some cases, the upper plug surface can move closer to the striker face 244. The flange or plug in general can conceal the barrier layer and seal against it to prevent infiltration or moisture seeping beyond the plug and into the recess or the hole 3H produced by the shaft.

Figure 12:
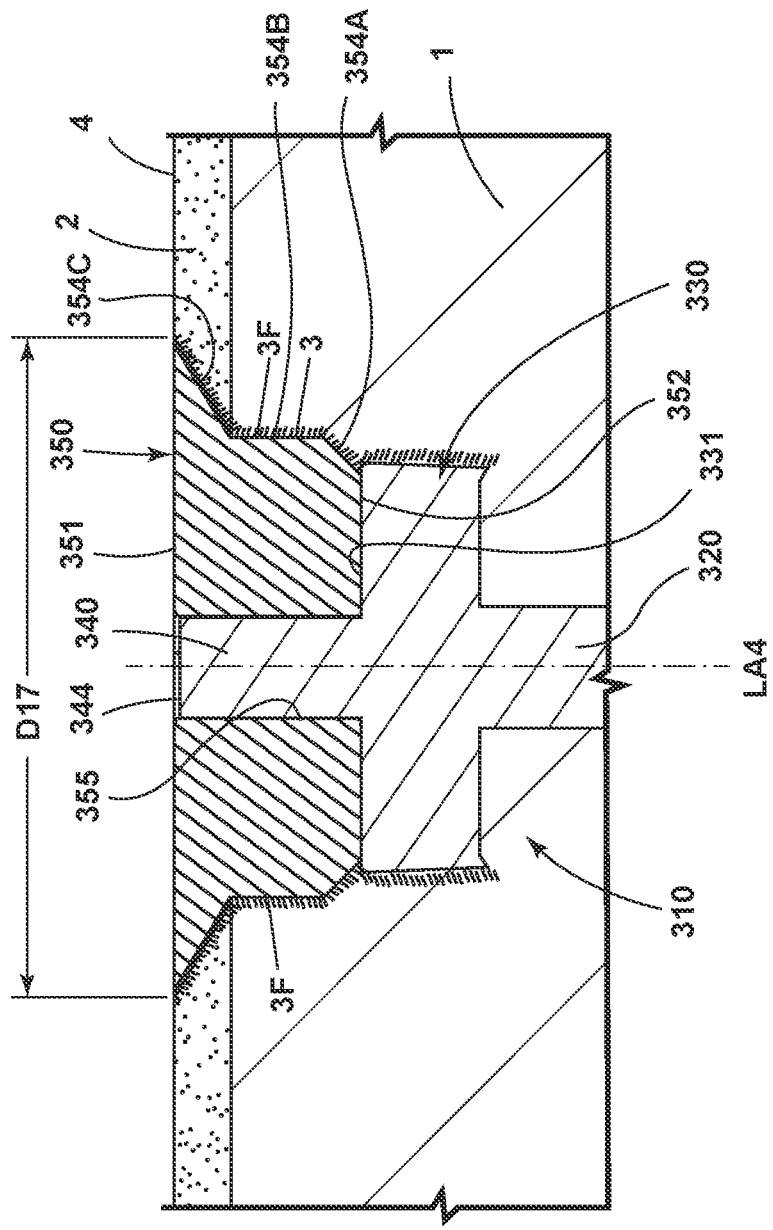
FIG. 12 is a section view of a fastener of a third alternative embodiment installed in the work piece having a barrier layer.

A third alternative embodiment of the fastener is shown in FIG. 12 and generally designated 310. This embodiment is similar to the embodiment above in structure, function and operation with several exceptions. For example, this fastener 310 can include a shaft 320, a head 330 and a plug 350 installed relative to the striker post 340. The plug, however, can be of a different configuration. As shown, the plug can include a lower tapered portion 354A that can be placed adjacent the upper head surface 331, optionally with the lower plug surface 351 adhered to that surface. The portion 354A can increase in diameter as it extends away from the head until it transitions to an optional cylindrical wall 354B. That wall can extend a height upward from the lower portion 354A to an outward extending flange 354C that can have a greater diameter D17 that the diameter of the portions 354B and 354A. The flange can be of an upside down frustoconical shape, and can function to seal over and against the edge of the barrier 4 when present or the exterior surface 4 in general as shown. The flange 354C also can extend outward from the longitudinal axis at a smaller angle, or a more acute angle than the lower portion as shown.

The method of using or installing this fastener 310 can be similar to that of the embodiments described above, so will not be described again here, other than to note that the lower tapered portion 354A assists in allowing the plug fit into and initially slide down along the newly created recess 3 and push against any fibers 3F (if present), while the flange 354C helps seal and conceal the hole cut in the barrier or exterior surface, in most cases covering entirely the same to further prevent infiltration or moisture seeping beyond the plug and into the recess or the hole produced by the shaft.

It will be appreciated that by identifying or naming herein certain elements as first, second, third, etc., that does not require that there always be a certain number of elements preceding, succeeding, above, below, adjacent and/or near the numbered elements. Further, any one of a numbered group of elements, for example, a third element, alternatively can be referred to as a first, second, fourth or other numbered row element. The same is true for the naming of any other elements in the form of a first element, second element, third element, etc. as used herein. Further, although the different elements and assemblies of the embodiments are described herein as having certain functional characteristics, each element and/or its relation to other elements can be depicted or oriented in a variety of different aesthetic configurations, which support the ornamental and aesthetic aspects of the embodiments, their elements and assemblies. Simply because an apparatus, element or assembly of one or more of elements is described herein as having a function does not mean its orientation, layout or configuration is not aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A fastener comprising:
an elongated shaft extending along a longitudinal axis from a proximal end to a distal end, the distal end including a pointed tip configured to penetrate a work piece;
a head joined with the proximal end and extending radially outward from the longitudinal axis, the head including a lower head surface and an upper head surface;
a striker post extending upward and away from the upper head surface to a terminal upper end, the terminal upper end including a striking surface, the striker post including an exterior post wall extending around the longitudinal axis; and
an elastomeric plug including an upper plug surface, a lower plug surface, an exterior plug wall, and an interior plug wall bounding a plug bore extending through the plug from the lower plug surface to the upper plug surface, the elastomeric plug positioned along the longitudinal axis with the striker post extending through the plug bore so that the exterior post wall faces the interior plug wall defining the plug bore, wherein the striking surface is adjacent the upper plug surface and disposed inwardly from the interior plug wall, wherein the striking surface is configured to be struck by a driving tool to advance the elongated shaft into the work piece such that the head penetrates the work piece to produce a recess into which the elastomeric plug is forced to plug the recess from a location above the head, wherein the lower plug surface engages the head only along the upper head surface.

2. The fastener of claim 1,
wherein the plug is positioned entirely above the head, without extending below the head.

3. The fastener of claim 2,
wherein the striking surface extends a distance above the upper plug surface.

4. The fastener of claim 1,
wherein the striker post is a cylindrical post,
wherein the plug bore is a cylindrical bore,
wherein the cylindrical bore is forced against and frictionally engages the cylindrical post to secure the plug to the fastener.

5. A fastener comprising:
an elongated shaft extending along a longitudinal axis from a proximal end to a distal end, the distal end including a pointed tip configured to penetrate a work piece;
a head joined with the proximal end and extending radially outward from the longitudinal axis, the head including a lower head surface and an upper head surface;
a striker post extending upward and away from the upper head surface to a terminal upper end, the terminal upper end including a striking surface, the striker post including an exterior post wall extending around the longitudinal axis; and
an elastomeric plug including an upper plug surface, a lower plug surface, an exterior plug wall, and an interior plug wall bounding a plug bore extending through the plug from the lower plug surface to the upper plug surface, the elastomeric plug positioned along the longitudinal axis with the striker post extending through the plug bore so that the exterior post wall faces the interior plug wall defining the plug bore,
wherein the striking surface is adjacent the upper plug surface and disposed inwardly from the interior plug wall,
wherein the striking surface is configured to be struck by a driving tool to advance the elongated shaft into the work piece such that the head penetrates the work piece to produce a recess into which the elastomeric plug is forced to plug the recess from a location above the head,
wherein the lower head surface includes a cutting edge around a perimeter of the head, the cutting edge configured to cut into the work piece to produce the recess.

6. The fastener of claim 1,
wherein no part of the fastener extends over any part of the upper plug surface.

7. The fastener of claim 1,
wherein the striker post extends above the upper plug surface without extending radially outward beyond the interior plug wall such that the upper plug surface remains uncovered.

8. The fastener of claim 7,
wherein the striker post extends away from the upper head surface farther than the plug, without any part of the fastener extending over the upper plug surface.

9. A fastener comprising:
an elongated shaft extending along a longitudinal axis;
a head joined with the elongated shaft and extending radially outward from the longitudinal axis;
a striker post extending upward and away from the head to a terminal upper end including a striking surface; and
a plug defining a plug bore, the plug positioned along the longitudinal axis with the striker post extending through the plug bore,
wherein the striking surface is configured to be struck by a driving tool to advance the elongated shaft into the work piece such that the head penetrates the work piece to produce a recess into which the plug is forced to plug the recess from a location above the head,
wherein the plug is positioned entirely above the head, without extending below the head.

10. The fastener of claim 9,
wherein the fastener is void of any structure extending outwardly from the striker post and above the plug.

11. A fastener comprising:
a shaft having a proximal end including a head and a distal end including a tip;
a striker post extending away from the head opposite the shaft; and
a plug mounted around the striker post above the head,
wherein the striker post is configured to be struck by a tool face to advance the tip and shaft into a work piece so that the head penetrates the work piece to produce a recess,
wherein the plug is configured to plug the recess in the work piece with the plug from a location above the head,
wherein the plug is positioned entirely above the head, without extending below the head.

12. The fastener of claim 11,
wherein the head is a single and only head of the fastener projecting outward from a longitudinal axis of the fastener.

13. The fastener of claim 11,
wherein the plug is upwardly slidable relative to the striker post.

* * * * *